United States Patent [19]

Lee

[11] Patent Number: 5,124,518
[45] Date of Patent: Jun. 23, 1992

[54] HIGH FREQUENCY HEATING APPARATUS HAVING AN OUTPUT CONTROLLING FUNCTION

[75] Inventor: Min K. Lee, Kyungsangnam-do, Rep. of Korea

[73] Assignee: Gold Star Co., Ltd., Seoul, Rep. of Korea

[21] Appl. No.: 628,003

[22] Filed: Dec. 17, 1990

[30] Foreign Application Priority Data

Dec. 15, 1989 [KR] Rep. of Korea ............... 19005/1989

[51] Int. Cl.$^5$ ............................................. H05B 6/68
[52] U.S. Cl. .................................. 219/10.55 B; 363/98
[58] Field of Search ................ 219/10.55 B, 10.55 R; 363/98, 97

[56] References Cited

U.S. PATENT DOCUMENTS

| | | | |
|---|---|---|---|
| 4,777,575 | 10/1988 | Yamato et al. | 219/10.55 B |
| 4,825,028 | 4/1989 | Smith | 219/10.55 B |
| 4,866,589 | 9/1989 | Satoo et al. | 219/10.55 B |
| 4,900,885 | 2/1990 | Inumada | 219/10.55 B |
| 4,920,246 | 4/1990 | Aoki | 219/10.55 B |

*Primary Examiner*—Philip H. Leung
*Attorney, Agent, or Firm*—Fish & Richardson

[57] ABSTRACT

A high frequency heating apparatus has an output controlling function to prevent breakdown of the switching element in an invertor circuit, while also eliminating noise generated by the frequency changes caused by the various consumption power signals generated. A microprocessor produces a consumption power change signal according to the user's preference, that activates a switching element, typically a solid-state component, as a function of the change signals produces. The inventive heating apparatus operates in an output control mode according to a particular duty cycle. A reference voltage is used with a comparator to produce a signal generating a pulse signal of variable width, according to the signals outputted from the microprocessor. The pulse width signals control the switching element to maintain a constant consumption power according to a particular duty cycle, thereby preventing the microprocessor output signals from adversely driving the switch element which leads to breakdown as a result of the undesirable noise generated due to the frequency change.

6 Claims, 6 Drawing Sheets

| P3 | P2 | P1 | VO |
|---|---|---|---|
| HIGH | HIGH | HIGH | 0 V |
| HIGH | HIGH | LOW | 1.33V |
| HIGH | LOW | HIGH | 2.4 V |
| HIGH | LOW | LOW | 3.27V |
| LOW | HIGH | HIGH | 4.0 V |
| LOW | HIGH | LOW | 4.6V |
| LOW | LOW | HIGH | 5.15V |
| LOW | LOW | LOW | 5.7 V |

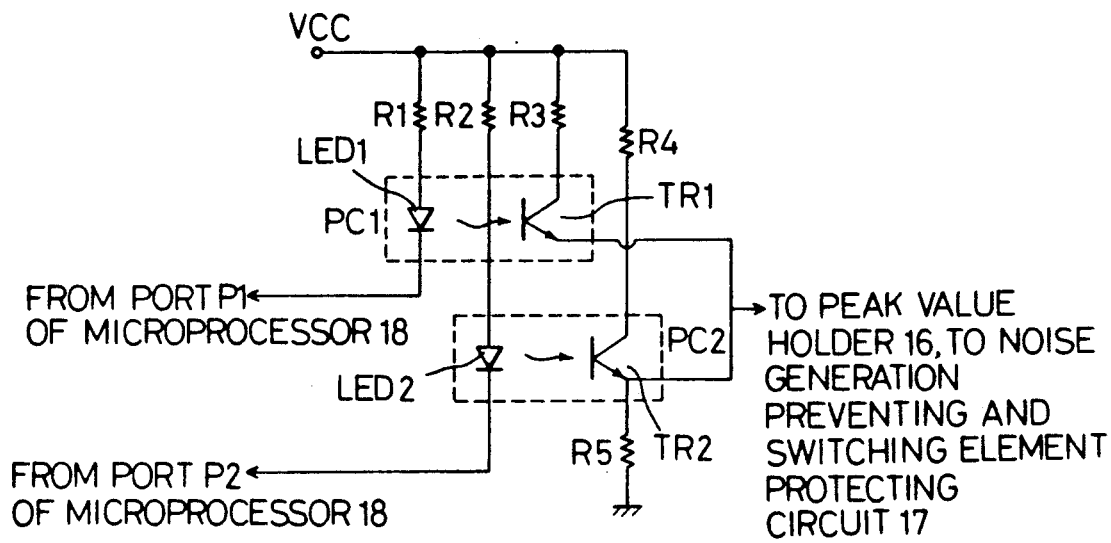
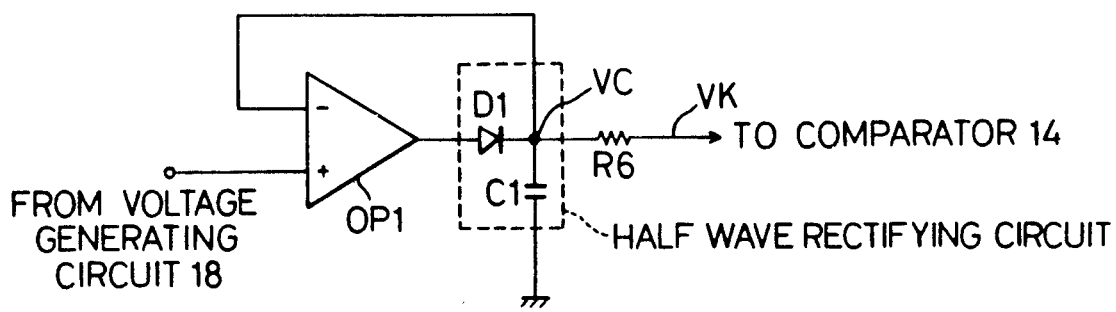

| P2 | P1 | VA |
|---|---|---|
| HIGH | HIGH | 0 V |
| HIGH | LOW | 3.15V |
| LOW | HIGH | 4.8V |
| LOW | LOW | 6.07V |

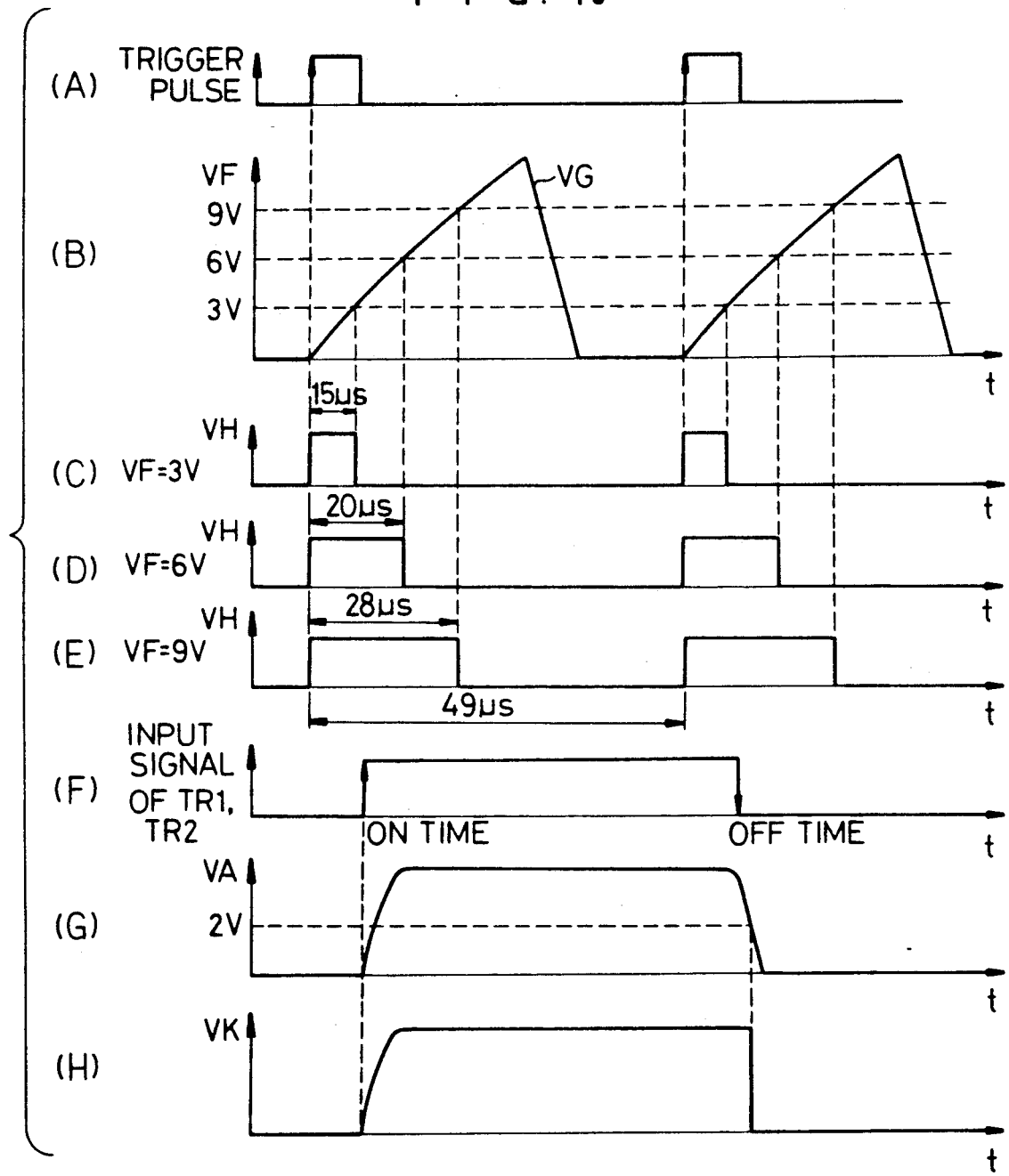

HIGH FREQUENCY HEATING APPARATUS HAVING AN OUTPUT CONTROLLING FUNCTION

BACKGROUND OF THE INVENTION

1. Field of the Invention

The present invention relates generally to a high frequency heating apparatus having an output controlling function and, more particularly, to a high frequency heating apparatus where a breakdown of the switching element and noise generated due to frequency change are both prevented.

2. Description of the Prior Art

In a conventional high frequency heating apparatus, a reference voltage generator which outputs a consumption power change signal corresponding to a plurality of predetermined high frequency outputs is constructed as follows:

As shown in FIG. 1, bases of transistors TR3–TR5 are connected to output ports P1–P3 of a microprocessor through resistors R11–R13, and collectors of transistors TR3–TR5 are connected to a non-inverting input terminal of a ground negative feedback amplifier with resistors R14–R17 and a condenser C3. The following describes the operating relationship of the apparatus of FIG. 1.

First, consumption power change signals are outputted from the microprocessor output ports according to the user's preference in eight varieties, as shown in FIG. 2. If the respective "low", "high", "low" signals from output ports P1–P3 of a microprocessor are outputted, transistors TR3, TR5 turn on and transistor TR4 turns off. This causes a voltage VO to be both inputted to the non-inverting input of a negative feedback amplifier, and outputted from the negative feedback amplifier, and outputted from the negative feedback amplifier, according to Formula (1) below:

$$VO = \frac{R17}{\frac{R14 \cdot R16}{R14 + R16} + R17} \times VCC = \frac{1K}{\frac{8K \times 2K}{8K + 2K} + 1K} \times 12\,V = 4.6[V] \quad (1)$$

If all "high" signals are outputted from the microprocessor, transistors TR3–TR5 turn off. Therefore, the output voltage VO becomes 0 V (zero volts). However, when transistors TR3–TR5 turn off, the voltage VO reduces exponentially when the charge of condenser C3 discharges through resistor R17. As the output voltage VO thus reduces slowly, an abnormal noise according to the frequency change is generated. If a plurality of output control terminals exist, there have been problems associated with the requirement that there be an increased plurality of output control ports of the microprocessor, which only adds to the adverse noise generation.

In U.S. Pat. Nos. 4,920,246, 4,593,167, 4,835,353, 4,833,581, 4,931,609, 4,900,885, there are disclosed conventional high frequency heating apparatuses related to the present invention. Of these, one representative example of a high frequency heating apparatus is the one described in U.S. Pat. No. 4,920,246. It comprises a high frequency heating source for providing a predetermined high frequency heating output, an invertor means including a rectifier for rectifying an AC input power, and a switching means for switching a DC voltage from the rectifier and providing a high frequency drive power source for driving the high frequency heating source; a voltage detection means for detecting output voltage values from switching elements of the invertor means, a microprocessing means for outputting an on-off signal where the determined generating timing depends on interrupt processing according to output voltages detected by the voltage detection means. The microprocessor includes a generating means for generating a reference clock, a counter means for counting the reference clock generated by the generating means according to a setting value related to a high frequency heating output, and on-off signal generating means for outputting on-off signals having respective on-off periods according to the counting result of the counter means.

Furthermore, this apparatus operates in an output control mode at a particular on-off time duty ratio (duty cycle) by using a microprocessor having a plurality of control signals. It detects an input current by use of a current transformer on a terminal of the AC input power source, feeds the current back to the microprocessor, and outputs a control signal through the output port by controlling the output quantities via the microprocessor. The apparatus is thus controlled by use of a portion of the AC input power source. However, there have been the following problems in this and other such apparatuses of the prior art. A control signal for driving a switching element is directly outputted by the microprocessor. Therefore, if the microprocessor itself generates error due to noise, etc., a high signal for driving a switching element is continuously outputted from an output port of the microprocessor. In such a case, the switching element may break down since more than the predetermined high voltage is applied to it.

SUMMARY OF THE INVENTION

The present invention has for its principal object to prevent the undesired generation of noise caused by a frequency change and a resulting breakdown of the switching element in an invertor.

It is another object of the present invention to provide a high frequency heating apparatus which can modulate an accurate output level by controlling an output according to a duty cycle, or time/duty ratio. As a consumption power change signal within the level corresponding to a high consumption power is changed to a continuous output voltage, simultaneously, a consumption power change signal within the level corresponding to the comparative middle to low consumption power is changed to a discrete output voltage.

According to the present invention, there is provided a high frequency heating apparatus comprising a voltage supply circuit for converting an AC input power source into a stable DC voltage, with the voltage supply circuit including a filter for filtering AC input power, a rectifier and a smoothing circuit; a magneton for outputting a plurality of predetermined high frequency heating signals; an invertor for supplying a drive power to the magnetron and for inputting the DC voltage, the invertor including a resonance condenser, a fly-wheel diode, a switching element for switching the DC voltage, and a high voltage transformer; a microprocessor for outputting one of various possible signals on more than one level in accordance with the user's preference, the microprocessor including a plurality of consumption power change signals for changing a consumption power corresponding to a plurality of predetermined high frequency heating signals outputted from the magnetron; a primary reference voltage generator comprising a voltage generating circuit for generating the predetermined reference voltage in accordance with a consumption power change signal of the microprocessor; a peak value holder for receiving an output signal of the voltage generating circuit, detecting a peak value, and holding it; a noise elimination circuit for comparing an output signal of the voltage generating circuit to a predetermined reference voltage and performing a sinking operation if the output signal is less than the reference voltage to disable the whole circuit of the apparatus; a control circuit for outputting the difference between the AC input and an output of the peak value holder for equalization, the control circuit including an AC input detection circuit for detecting the AC input power, a comparator for comparing an output signal of the AC input power detection circuit to an output signal of the peak value holder, and an integrating circuit for integrating the output of the comparator; and a control signal output circuit for outputting a control signal for driving a switching element according to the output signal of the control circuit, the control signal output circuit including a trigger generator for generating a trigger signal at the zero point of the switching element, a sawtooth oscillator for converting the trigger signal into a sawtooth wave, a pulse width modulator for generating a given width pulse according to the output signal of the sawtooth oscillator and the integrating circuit, and a driving circuit for driving a switching element according to an output signal of the pulse width modulator.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 4 is an equivalent circuit diagram of the voltage generating circuit according to FIG. 3;

FIG. 5 is an equivalent circuit diagram of the peak value holder according to FIG. 3;

FIGS. 10A to 10H are timing flow charts showing switching waveforms of the respective circuits to explain the operation of the block diagram shown in FIG. 3.

DETAILED DESCRIPTION OF THE INVENTION

Figures 1, 2:
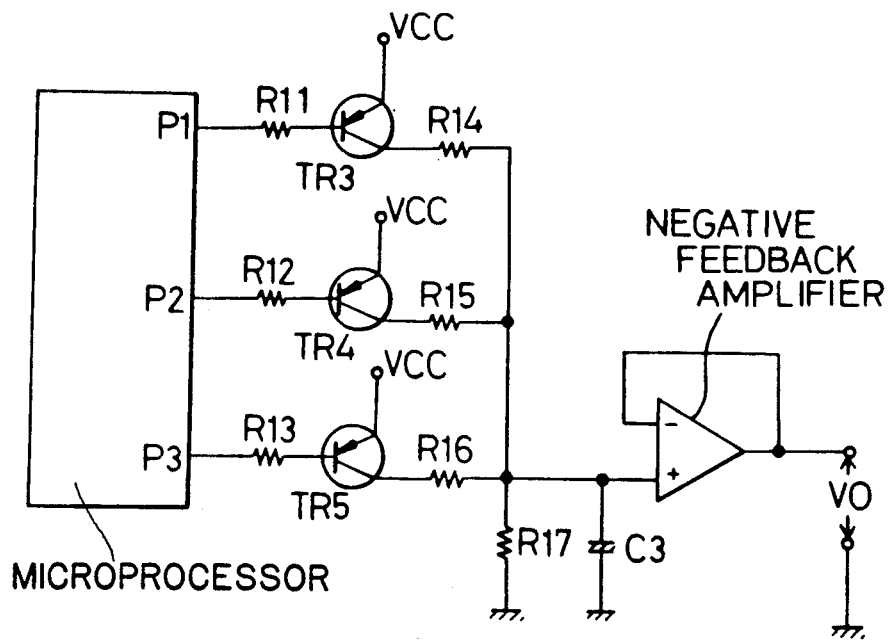
FIG. 1 is a reference voltage generating circuit diagram of a conventional high frequency heating apparatus.
FIG. 2 is an illustration of combinations of output signals from the respective ports of a microprocessor according to FIG. 1.
Figure 3:
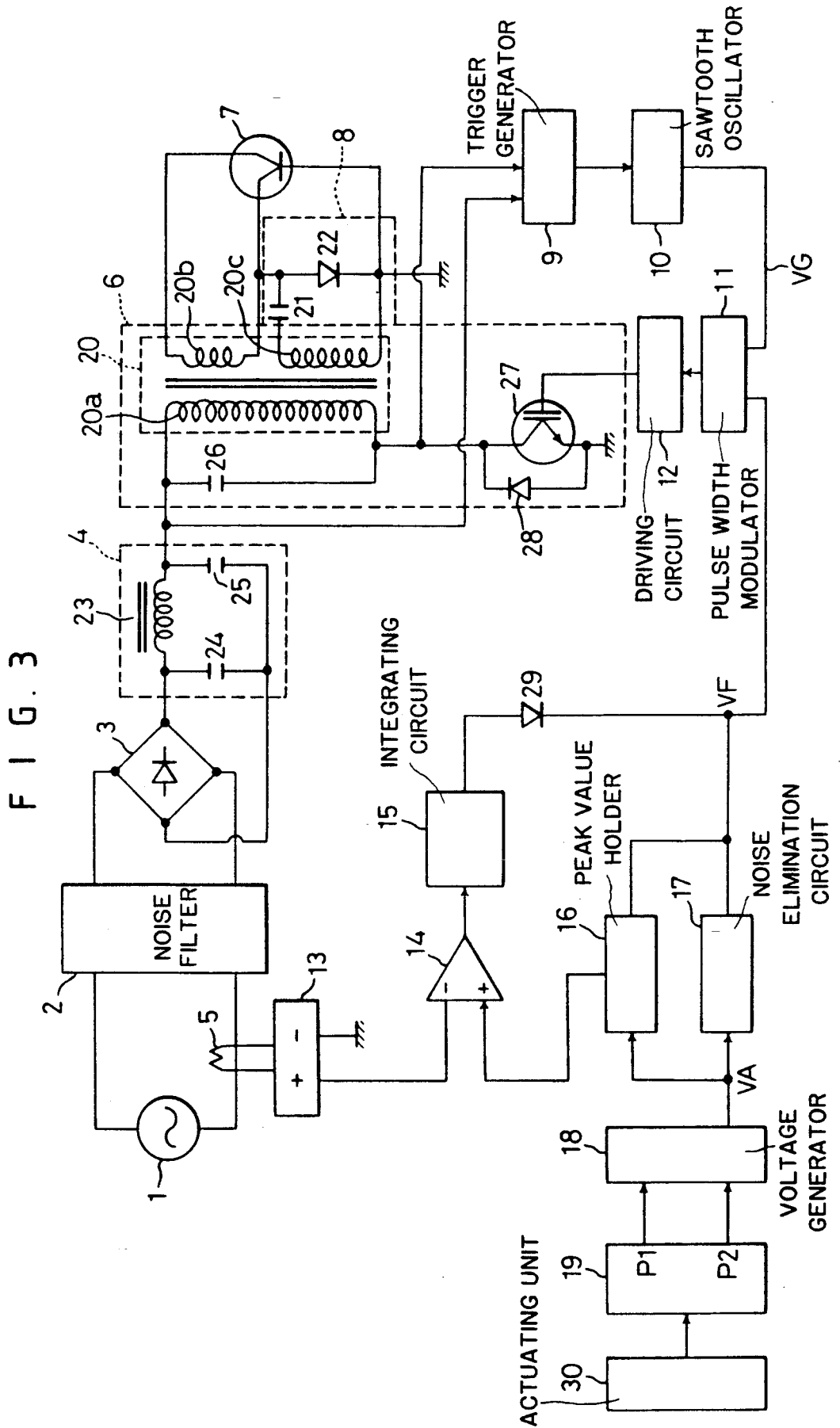
FIG. 3 is a block diagram of a high frequency heating apparatus according to the present invention.

FIG. 3 of the drawings is a combination block diagram and component illustration of the present invention. The output terminal of a noise filter 2, the input of which is connected to the output terminal of AC input power source 1, is connected through a rectifying circuit 3 and a smoothing circuit 4 to one end of the primary coil 20a of a high voltage transformer 20 and, by means of a parallel connection, to a resonance condenser 26, both the transformer and the condenser being components of an invertor circuit 6. The other end of primary coil 20a of high voltage transformer 20 is connected to the collector of a switching element 27 (a gate insulated bipolar transistor) and to a trigger generator 9. The base of switching element 27 is connected to the output of a pulse width modulator 11 delivered through a driving circuit 12. Simultaneously, the output of trigger generator 9 is connected as one input to the pulse width modulator 11. The secondary coil 20c of the high voltage transformer 20 is connected to a magneton 7 through a voltage doubler 8.

A current transformer 5 associated with a terminal of the AC input power source 1 is connected to the inverting input terminal of a comparator 14 which provides a negative feedback amplifying function through AC input detecting circuit 13. The input terminal of an integrating circuit 15 is connected to the output terminal of comparator 14, and the output terminal of integrating circuit 15 is connected as another input to pulse width modulator 11 through a diode 29. The non-inverting input terminal of comparator 14 is connected to an output terminal of a peak value holder 16.

In addition, an actuating unit 30 is connected to an input terminal of a microprocessor 19. Output ports P1, P2 of microprocessor 19 are connected to respective input terminals of a voltage generator 18. Output terminals of voltage generator 18 are connected to the input terminal of the peak value holder (or peak value detector) 16, and to the input terminal of a noise elimination circuit 17. The output terminal of the noise elimination circuit is connected at a common junction to the output terminals of integrating circuit 15 after that output passes through diode 29, and to the output of the peak value holder 16. This common junction is connected to a second input of pulse width modulation circuit 11.

FIG. 4 is an equivalent circuit diagram of the voltage generating circuit 18 which comprises photocouplers PC1, PC2 including photodiodes LED1, LED2 and phototransistors TR1, TR2 and resistors R1-R4 connected to a DC voltage source VCC and to the photocouplers PC1, PC2.

FIG. 5 is an equivalent circuit diagram of the peak value holder 16, which comprises a negative feedback amplifier OP1 and a half-wave rectifying circuit including a diode D1 and capacitor C1 connected to the output terminal of negative feedback amplifier OP1, and a resistor R6.

Figure 6:
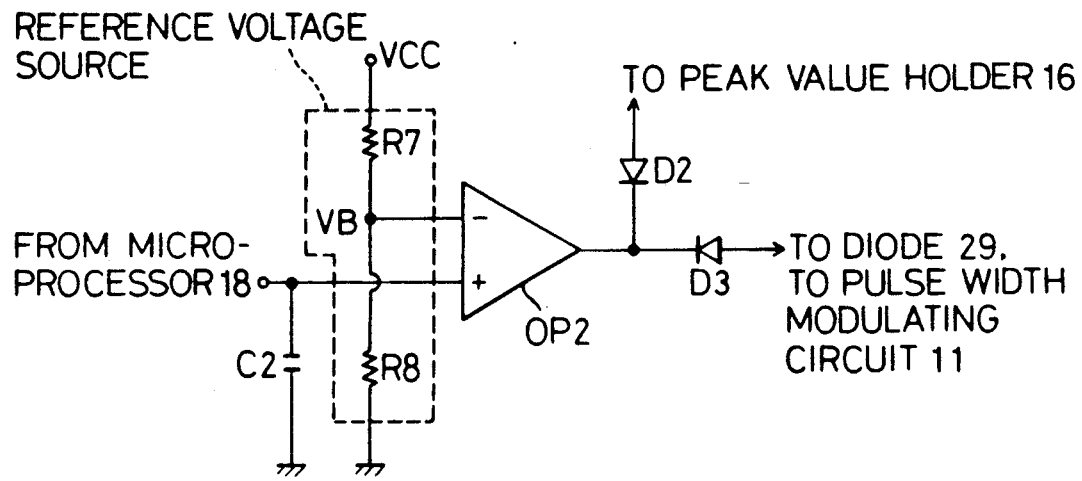
FIG. 6 is an equivalent circuit diagram of a noise elimination circuit according to FIG. 3.

FIG. 6 is an equivalent circuit diagram of the noise elimination circuit 17 which comprises a reference voltage generating circuit including a resistor R7, a resistor R8 and DC voltage source VCC, a comparator OP2, capacitor C2, and diodes D2, D3 connected to the output terminal of comparator OP2.

Figure 7:
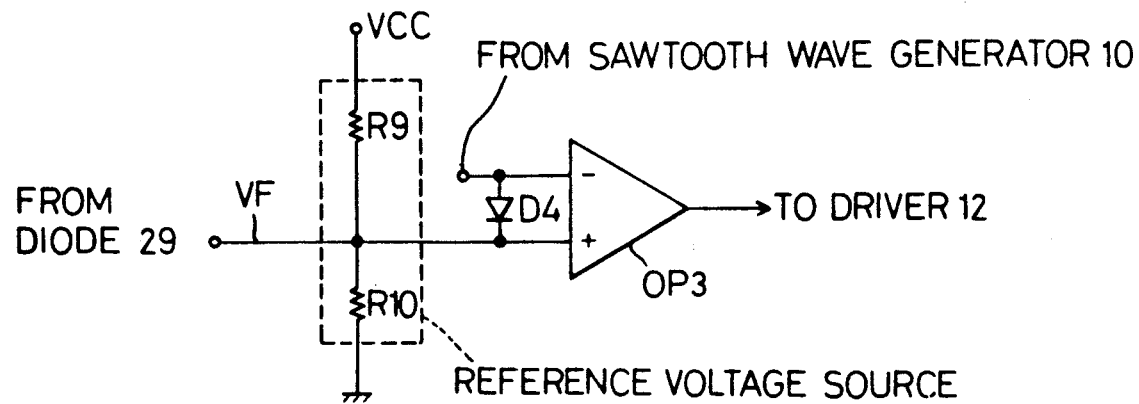
FIG. 7 shows the pulse width modulation circuit at 11 in FIG. 3.

FIG. 7 is an equivalent circuit diagram of the pulse width modulation circuit which comprises a reference voltage circuit including resistors R9, R10 for generating a reference voltage at initial operation, a comparator OP3, and a diode D4 connected between two input terminals.

Figures 8, 9:
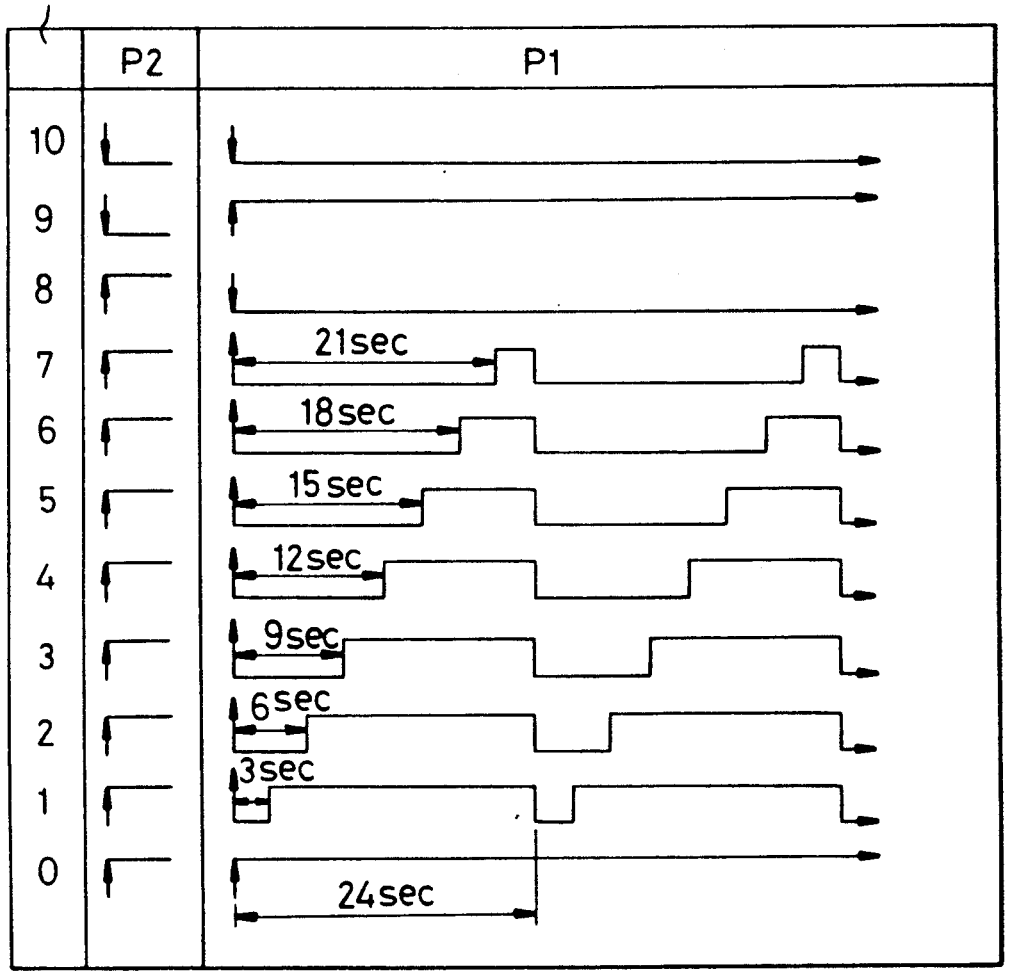
FIG. 8 shows an embodiment with different consumption power output levels.
FIG. 9 shows different output voltages for different consumption power output combinations.

FIG. 8 is an illustration of a plurality of consumption power change signals of microprocessor 19.

FIG. 9 is an illustration of the output voltage VA of the voltage generating circuit 18 according to the consumption power change signals of FIG. 8.

The operation of the present invention will be described in detail with reference to the attached FIGS. 10A to 10H.

First, when power is applied from actuating unit 30 to microprocessor 19, initial signals at output ports P1, P2 of the microprocessor are "high" signals of the lowest output level 0, as shown in FIG. 8. These signals are delivered to photodiodes LED1, LED2 of photocouplers PC1, PC2 of the voltage generating circuit 18, as shown in FIG. 4, and act to turn OFF phototransistors TR1, TR2 in the circuit of FIG. 4. This causes an output voltage VA to appear at the output of voltage generating circuit 18.

With reference to FIGS. 5-6, when output voltage VA from voltage generating circuit 18 is connected as input to the non-inverting input terminal of negative feedback amplifier OP1 of peak value holder 16, and at the same time also as input to comparator OP2 of the noise elimination circuit, and equals zero volts, 0 V, the output signal VF of comparator OP2 in FIG. 6 is "low". Since the potential of VF is "low", the potential of VC (FIG. 5) is higher than that of VF, which causes diode D4 to turn on, causing the output of the comparator OP3 of pulse width modulator 11, as shown in FIG. 7, to be "low".

As the gate insulated bipolar transistor of switching element 27 is turned off, the primary coil 20a of high voltage transformer 20 turns off.

Following the condition set forth above, if the user next sets for a maximum output state by controlling microprocessor 19 by means of input signals from actuating unit 30, the output ports P1, P2 of microprocessor 19 change to "low" signals as shown at output level 10 in FIG. 8. As a result thereof, photodiodes LED1, LED2 of voltage generating circuit 18 (FIG. 4) turn on and phototransistors TR1, TR2 turn on. Then, if the values of resistors R3-R5 are respectively 5.6KΩ, 3.0KΩ, 2KΩ, voltage VA is 6.07 V according to the following formula (2):

$$VA = \frac{R5}{R5 + R3//R4} \times 12 = 6.07[V] \quad (2)$$

Various voltages VA obtained through the same method for differing output signals from microprocessor 19 are shown in FIG. 9.

Accordingly, since the voltage VA is higher than a reference voltage VB within noise elimination circuit 17 set by resistor R7 and resistor R8 (FIG. 6), the output of comparator OP2 is "high"; also, as diode D3 is cut off, distributing voltage VF established by resistors R9, R10 of pulse width modulator 11 is applied to a non-inverting terminal of a comparator OP3 and the voltage VF is used on first operation.

As shown in FIG. 6, a noise elimination circuit 17 prevents noise generation and a breakdown of the switching element 27 due to frequency change as output voltage VA of the voltage generating circuit 18, as a function of the output signals of microprocessor 19, is higher than a reference voltage VB=2 V, as set by resistors R7 and R8 (FIG. 6) in the preferred embodiment. The voltage value 2 V is set for the minimum operable time of 8 μsec, as obtained from repeated experiments with switching element 27. The maximum limit of the time is 15 μsec. If the operable time is less than 8 μsec, a "low signal" is outputted and a current sinking operation is executed by diodes D2 and D3.

For initial operation, output signal VF is lower than the output voltage of integrator 15 that is generated when controlling a normal output, because if a consumption power change signal is, for example, at a level 8 (FIG. 8), voltage VA is 3.15 V as shown in FIG. 9, and if the output of AC input detecting circuit 13 is also 3.15 V, an output of comparator 14 is generated and integrated by an integrating circuit 15 and becomes voltage VF through diode 29 and an actual input is generated above the desired control level.

As voltage VA is applied to the non-inverting input terminal of feedback amplifier OP1 of peak value holder 16 as shown in FIG. 5, the output signal Vo of feedback amplifier OP1 turns "high"; however, since the output signal Vo is applied as feedback to the inverting input terminal of amplifier OP1 through a half-wave rectifier, a peak output value VC is detected and held.

In addition, when photodiodes LED1, LED2 of voltage generating circuit 18 as shown in FIG. 4 are OFF, and also phototransistors TR1, TR2 are OFF, the level of output voltage VA is exponentially reduced as shown in FIG. 10G; however, the level of the "held" voltage VC (FIG. 5) remains stable.

If voltage VA is less than the 2 volt reference voltage, voltages VC and VK in FIG. 5 are both "low" and also voltage VF is "low"; therefore, switching element 27 of invertor 6 is immediately turned off.

In other words, even if voltage VA exponentially reduces, voltages VC and VK are stable when voltage VA is more than 2 V. Switching element 27 is immediately turned OFF when VA is less than 2 V, and therefore when OFF, the generation of a frequency change rate according to an output change rate can be prevented.

Furthermore, in normal operation, the potential VA due to the negative feedback amplifying function of comparator 14 is equal to that of VC and VK. Also, the level of VA is equal to the output of AC input detecting circuit 13.

Various states of outputs P1, P2 of microprocessor 19 according to a designated output level is shown in FIG. 8. For example, if an output level is 10, terminals P1, P2 of microprocessor 19 are both in a "low" state, and voltage VA as shown in FIG. 9 is about 6 volts and this voltage is inputted to the non-inverting (+) input terminal of comparator 14 through peak value holder 16. The comparator 14 compares the (+) input terminal voltage to the AC input power source received at the inverting input of comparator 14 through AC input detecting circuit 13. Comparator 14 outputs the difference between the two inputs, and after the difference signal is integrated and amplified through integrating circuit 15, the integrated signal is delivered, through a diode 29, to the non-inverting terminal of comparator OP3 of pulse width modulator 11, as shown in FIG. 7. Then, after a trigger signal of trigger generator 9, generated at the start point of the turn ON of switching element 27, is converted into a sawtooth wave VG by means of sawtooth oscillator 10, it is inputted to the inverting terminal of comparator OP3 in FIG. 7.

Comparator OP3 compares the two signals VF and VG, as shown in FIG. 10B, and generates different width pulses as shown in FIGS. 10C to 10E according to the voltage VF value. That is, even if microprocessor 19 outputs a variety of consumption power change signals as illustrated in FIG. 8, the operation as described above is performed. In particular, referring to FIG. 8, if the consumption power change signals are in a "high" or "low" continuous level state at an output level of 8 or above, switching element 27 is continuously controlled to maintain a constant consumption power and not to be turned ON and OFF.

On the other hand, if an output level less than 8, as shown in FIG. 8, is produced, switching element 27 is turned ON and OFF at a particular ON-OFF time duty ratio (duty cycle) and in this manner controls the output of the high frequency heating apparatus. Therefore, the flickering of an electric light generated by frequency noise can be reduced and the output of the heating apparatus can be accurately controlled up to the low level of a consumption power change signal.

As described above, according to the present invention, as outputs are continuously generated within the high output levels 8-10 of the consumption power change signals shown in FIG. 8, the flickering of an electric light can be minimized, and as a high frequency output is controlled by the time duty method, or duty cycle of switching element 27, an accurate output can be regulated.

Particularly, there is provided an effect whereby the noise due to frequency changing and the breakdown of a switching element is prevented. As soon as the unit generates constant outputs, switching element 27 and the control immediately turn OFF.

The many features and advantages of the invention are apparent from the detailed specification, and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation illustrated and described. Accordingly, all suitable modifications and equivalents may be resorted to as falling within the scope and spirit of the invention.

What is claimed is:

1. A high frequency heating apparatus having an output controlling function comprising:
    a voltage supply circuit for receiving an AC input power comprising an AC input voltage and converting said AC input power to a stable DC voltage, said voltage supply circuit including a filter connected to receive said AC input power for filtering noise from said AC power to produce a filtered power, a rectifier for receiving said filtered power and providing a rectified DC voltage, and a smoothing circuit connected to said rectifier for producing a smoothed rectified DC voltage;
    invertor means for receiving said smoothed rectified DC voltage and supplying a high frequency drive power, said invertor means comprising a switching element having a maximum and a minimum turn-on time for switching DC voltage inputted from said voltage supply circuit, and a high voltage transformer connected to said switching element;
    a magnetron for receiving said high frequency drive power and outputting a plurality of predetermined high frequency heating signals;
    a microprocessor for outputting one of a plurality of signals generated on more than one level in accordance with a user's preference, said microprocessor including a plurality of consumption power change signals for changing a consumption power corresponding to a plurality of predetermined high frequency heating signals outputted from said magnetron;
    a reference voltage generating circuit connected to receive output signals from said microprocessor for generating an output signal comprising a predetermined reference voltage in accordance with a consumption power change signal output of said microprocessor, said reference voltage generating circuit including a voltage generating circuit for generating output signals comprising the predetermined voltage according to output signals of said microprocessor; and
    a peak value holder circuit connected to receive the reference voltage of said voltage generating circuit and detecting a peak value of said reference voltage and holding said peak value;
    a noise elimination circuit connected to receive the reference voltage of said voltage generating circuit for disenabling the whole circuit of the apparatus and performing a sinking operation if an output voltage of said voltage generating circuit is less than the predetermined voltage;
    control circuit means for receiving said AC input voltage and said peak value of said reference voltage, and integrating and outputting the difference between the AC input voltage and an output of a peak value holder to equalize thereof to produce an output difference signal, said control circuit including an AC input detection circuit having an input as a function of said AC input power and a comparator for receiving an output of said AC input detecting circuit and said peak value output signal, and comparing the output of the peak value holder to said AC input detection circuit to produce a difference signal as the comparator output; an integrating circuit for receiving the comparator output and providing an integrated comparator output signal; and
    a control signal generating circuit for outputting a control signal to drive a switching element according to an output signal of said control circuit, said control signal output circuit including a trigger generator for receiving as inputs said smoothing circuit output signal and a signal from said invertor circuit, and generating a trigger output signal from a zero point of said switching element, a sawtooth oscillator for receiving said trigger output signal and converting said trigger signal into a sawtooth wave, a pulse width modulation circuit for receiving said sawtooth wave and said integrated difference signal and generating a given width pulse output signal as a function of said sawtooth wave and said integrated difference signal; and
    driving means connected to receive said given pulse width signal for driving the switching element according to said given pulse width signal.

2. A high frequency heating apparatus according to claim 1, wherein said plural consumption power change signals in said microprocessor are outputted on one of two levels whereby change signals falling in the range of a high consumption power of said plurality of consumption power change signals are set on a continuous level to control the consumption power, and change signals falling in the ranges of a middle and low consumption power are set on a discrete level to control the consumption power and further where said switching element is turned ON or OFF by a time duty ratio method.

3. A high frequency heating apparatus according to claim 1, wherein the noise elimination circuit comprises a reference voltage source for generating the predetermined voltage corresponding to said minimum turn-on time of said switching element, a comparator for comparing a voltage of the reference voltage source and the output voltage of said voltage generating circuit and producing a difference signal at an output of the comparator, and a plurality of diodes connected to the output of said comparator.

4. A high frequency heating apparatus according to claim 3, wherein said minimum turn-on-able time of said switching element in said invertor is within the range of about 8 $\mu$sec–15 $\mu$sec.

5. A high frequency heating apparatus according to claim 1, wherein said peak value holder of said reference voltage generating circuit comprises a feedback amplifier for inputting the output voltage of said voltage generating circuit and a rectifier for rectifying the output signal of said feedback amplifier.

6. A high frequency heating apparatus according to claim 1, wherein said voltage generating circuit comprises a constant DC voltage source, a plurality of photocouplers connected to the output terminal of said microprocessor, and a plurality of diodes connected between said photocouplers and a constant DC voltage source.

* * * * *